(12) United States Patent
Foret

(10) Patent No.: US 7,422,695 B2
(45) Date of Patent: Sep. 9, 2008

(54) TREATMENT OF FLUIDS WITH WAVE ENERGY FROM A CARBON ARC

(75) Inventor: Todd Foret, Lafayette, LA (US)

(73) Assignee: Foret Plasma Labs, LLC, The Woodlands, TX (US)

( * ) Notice: Subject to any disclaimer, the term of this patent is extended or adjusted under 35 U.S.C. 154(b) by 0 days.

(21) Appl. No.: 10/935,786

(22) Filed: Sep. 7, 2004

(65) Prior Publication Data

US 2007/0062801 A1   Mar. 22, 2007

Related U.S. Application Data

(60) Provisional application No. 60/500,445, filed on Sep. 5, 2003.

(51) Int. Cl.
*C02F 1/32* (2006.01)

(52) U.S. Cl. ...................... 210/748; 210/788

(58) Field of Classification Search .......... 210/243, 210/748, 788; 250/428, 432 R, 434, 438, 250/493.1; 204/554; 422/24, 186.3
See application file for complete search history.

(56) References Cited

U.S. PATENT DOCUMENTS

| | | | |
|---|---|---|---|
| 2,139,657 A * | 12/1938 | Baeckler ............ 250/434 |
| 2,705,219 A | 12/1955 | Heiskell et al. |
| 3,201,337 A | 8/1965 | Eichelberger et al. |
| 3,324,334 A | 6/1967 | Reed |
| 3,567,921 A | 3/1971 | Holiday |
| 3,769,517 A | 10/1973 | Coleman |
| 3,772,172 A | 11/1973 | Zhagatspanian et al. |
| 3,826,920 A | 7/1974 | Woodroffe et al. |
| 3,924,246 A | 12/1975 | Scherer |
| 3,998,477 A | 12/1976 | Delahaye et al. |
| 4,002,918 A | 1/1977 | Graentzel |
| 4,279,743 A | 7/1981 | Miller |
| 4,296,066 A | 10/1981 | Schenck |
| 4,317,041 A | 2/1982 | Schenck |
| 4,381,978 A | 5/1983 | Gratzel et al. |
| 4,397,823 A | 8/1983 | Dimpfl |
| 4,427,636 A | 1/1984 | Obenshain |
| 4,454,835 A | 6/1984 | Walsh et al. |
| 4,476,105 A | 10/1984 | Greenbaum |
| 4,488,935 A | 12/1984 | Ruhe |
| 4,544,470 A | 10/1985 | Hetrick |
| 4,622,115 A | 11/1986 | O'Neill |
| 4,626,648 A | 12/1986 | Browning |
| 4,774,026 A | 9/1988 | Kitamori et al. |

(Continued)

OTHER PUBLICATIONS

"Lectures: On Illuminating Engineering Delivered At The Johns Hopkins University", Published 1911 by Johns Hopkins Press, p. 140.*

(Continued)

*Primary Examiner*—Matthew O Savage
(74) *Attorney, Agent, or Firm*—Daniel J. Chalker; Chalker Flores, LLP

(57) ABSTRACT

A method of and apparatus for treating liquids flowing in a thin film around a source of wave energy to directly expose the liquid to the wave energy, preferably generated in whole or part by an electrical arc between carbon electrodes. In addition to the wave energy generated by the electrical arc, energy generated by cavitation of the flowing liquid may be used in treating the liquid.

8 Claims, 2 Drawing Sheets

Treatment of Fluids With Carbon Arc

U.S. PATENT DOCUMENTS

| Patent Number | | Date | Inventor(s) |
|---|---|---|---|
| 4,803,365 | A | 2/1989 | Krause et al. |
| 4,863,608 | A | 9/1989 | Kawai et al. |
| 4,868,127 | A | 9/1989 | Blades et al. |
| 4,948,980 | A | 8/1990 | Wedekamp |
| 4,957,773 | A | 9/1990 | Spencer et al. |
| 5,045,288 | A | 9/1991 | Raupp et al. |
| 5,094,815 | A | 3/1992 | Conboy et al. |
| 5,120,450 | A | 6/1992 | Stanley, Jr. |
| 5,124,131 | A | 6/1992 | Wekhof |
| 5,126,111 | A | 6/1992 | Al-Ekabi et al. |
| 5,149,377 | A | 9/1992 | Esrom et al. |
| 5,200,156 | A | 4/1993 | Wedekamp |
| 5,413,768 | A | 5/1995 | Stanley, Jr. |
| 5,439,595 | A * | 8/1995 | Downey, Jr. ............ 210/748 |
| 5,439,652 | A | 8/1995 | Sczechowski et al. |
| 5,529,701 | A | 6/1996 | Grisham et al. |
| 5,531,904 | A | 7/1996 | Grisham et al. |
| 5,611,896 | A | 3/1997 | Swanepoel et al. |
| 5,662,811 | A | 9/1997 | Grisham et al. |
| 5,680,014 | A | 10/1997 | Miyamoto et al. |
| 5,696,380 | A | 12/1997 | Cooke et al. |
| 5,730,875 | A | 3/1998 | Grisham et al. |
| 5,832,361 | A | 11/1998 | Foret |
| 5,866,910 | A | 2/1999 | Cooke et al. |
| 5,994,705 | A | 11/1999 | Cooke et al. |
| 6,004,386 | A | 12/1999 | Grisham et al. |
| 6,019,947 | A | 2/2000 | Kucherov |
| 6,187,206 | B1 * | 2/2001 | Bernier et al. ............ 210/721 |
| 6,355,178 | B1 | 3/2002 | Couture et al. |
| 6,565,803 | B1 | 5/2003 | Bolton et al. |
| 6,693,253 | B2 | 2/2004 | Boulos et al. |
| 6,713,771 | B2 * | 3/2004 | Nakagawa et al. ......... 250/436 |

OTHER PUBLICATIONS

International Search Report and Written Opinion for PCT/US2007/008529 dated Jun. 11, 2008.

* cited by examiner

Treatment of Fluids With Carbon Arc

Carbon Arc in Gas-Sparged Pipe with Tangential Flow

Carbon Arc in Cyclone separator

Carbon Arc in Gas-Sparged Hydrocyclone

TREATMENT OF FLUIDS WITH WAVE ENERGY FROM A CARBON ARC

RELATED APPLICATION DATA

This application claims the benefit of U.S. Provisional Patent Application Ser. No. 60/500,445, filed Sep. 5, 2003.

FIELD OF THE INVENTION

The present invention generally relates to devices and methods used to treat fluids with wave energy, and in its preferred embodiments more particularly relates to the treatment of fluids with wave energy generated by a carbon arc.

BACKGROUND OF THE INVENTION

The term "wave energy" is used herein to include radiation as well as wave energies transmitted by various mediums, and embraces electromagnetic waves or radiations; sonic, supersonic, and ultrasonic waves; neutrons, protons, deuteron, and other corpuscular radiations. The term "electromagnetic waves" includes, e.g., X-ray, gamma-ray, ultraviolet, infra red, and visible light rays, and short electric and radio waves. These definitions and terms are consistent with those used by the U.S. Patent and Trademark Office for classification purposes.

Electromagnetic radiation (EMR) is one of the most pervasive forms of wave energy known and used by man. Sunlight, both within and beyond the visible spectrum, is one example of EMR wave energy that has been highly beneficial to man, and all life on earth. Man has harnessed the benefits of EMR through the development of such great inventions such as the light bulb, X-rays and radio waves. Another utilization of wave energy, welding, has been an important factor in the development of modem technologies. Similarly, the steel industry grew rapidly due to another wave energy technology known as the electric arc, used for melting iron ore and converting it to steel.

Although the industrial revolution has brought about the luxuries and simplicities of life, there has been a world-wide downside - pollution. Nowadays, it is common to find many waterways, drinking water sources, air and soils contaminated with pollutants. Although many technologies have been developed for removing contaminants from water and air, more and more engineers and scientists are turning to ultraviolet (UV) light systems for treating fluids.

One of the greatest inventions of all time is the light bulb. One of the earliest forms, Thomas Edison's carbon arc light bulb, has all but faded into extinction. A few very large carbon arc systems such as World War II vintage carbon arc searchlights are available today as rebuilt units. However, in general carbon arc lights are not utilized today for industrial and residential lighting, as searchlights or for photochemical reaction type applications. The carbon arc light bulb has been almost entirely replaced for those purposes by fluorescent bulbs, high pressure mercury vapor lamps, compact ceramic lamps and high pressure xenon lamps.

Another form of wave energy is sonic energy, and particularly ultrasonic energy. Ultrasonic waves are more commonly referred to as ultrasound. Ultrasound plays an important role in medical diagnostics, submarine sonar, ship sonar, non-destructive testing of metal, and cleaning equipment.

Photochemical reactions are well known and well documented. The use of electromagnetic radiation (EMR) particularly within the ultraviolet (UV) region, between 4 to 400 nanometers (nm), for treatment of fluids such as disinfection of drinking water and wastewater, free radical generation (hydroxyl radicals, chlorine radicals, etc.) and removal of noxious air contaminants such as VOCs, NOx, SOx from flue gas (off gas, tail gas) has gained in popularity over the past decade. In addition, advanced UV processes such as Advanced Oxidation, which incorporates UV light with an oxidant such as ozone or hydrogen peroxide, generate free radicals for decomposition of contaminants. Another UV art, which is rapidly receiving attention, is PhotoCatalytic Oxidation (PCO). PCO technology incorporates a semi-conductor catalyst in combination with UV radiation for generation of free radicals. PCO technology can use sunlight since the photons of interest for the most common photocatalyst, $TiO_2$, lies between 320 to 400 nm and more specifically at about 365 nm.

Although there are many methods and devices known in the art, their applications are specific and limited. It is highly unlikely, for example, that an EMR device used for water disinfection can be used for air purification. Likewise, a PCO device designed for air disinfection has significant drawbacks when an attempt is made to utilize that technology in a liquid environment. This can be clearly demonstrated by a close review of the prior art.

There are a number of major obstacles which have not been overcome by the prior art. One major obstacle is residence time versus absorbance. The result of the failure of the prior art to overcome this obstacle is perceived by the end-user (customer) as a problem of "not having enough lights," of "light penetration," and/or of "excessive energy requirements (inefficient)". When a photochemical reactor is designed and built for a specific set of parameters, the actual parameters in which the reactor is operated are variable and often change after the reactor put into service. Operators must make do with the photochemical reactor or the reactor is taken out of operation and decommissioned.

Given the past inadequacies of wave energy systems, in particular EMR systems employing UV/visible radiation, many designs have incorporated more lights, transparent glass sleeve wipers, redundant systems, or methods, which allows for more/better contact between the contaminants and the photons or the photocatalyst and the photons. However, the changes still do not overcome the problem of residence time versus absorbance. Thus, if the problems associated with both residence time and absorbance can be eliminated or solved, then an ideal photochemical reactor as well as method (for photochemical reactions) can be designed for many different applications. The problem of absorbance is inversely proportional to EMR transmission.

A number of attempts to advance the technology and to overcome problems and drawbacks in this field have been made, and are reflected in a number of patent documents.

U.S. Pat. No. 3,998,477—dated Dec. 21, 1976, discloses a device for non-rigid connection of two rigid cylindrical pipes, which comprise the combined use of flexible double lipped gaskets and toroid flexible gaskets surrounding a bulb-shaped zone formed in one of the pipes. The device is particularly useful for fastening fragile tubes containing light emitters to metal reactors used for photochemical processes.

U.S. Pat. No. 4,002,918—dated Jan. 11, 1977, discloses an apparatus for the irradiation of fluids in which the fluid is conducted along the walls of a container having walls which are permeable for the radiation to which the fluid is exposed. Radiation sources are arranged around the container and an active rotor is disposed within the container. The rotor consists of a body having axial bores and pins movably disposed in the bores and adapted to engage with their front ends the container walls thereby to wipe any deposits from the container walls during rotation of the rotor.

U.S. Pat. No. 4,317,041—dated Feb. 23, 1982, discloses various embodiments of photo-reactors in which there are at least two radiation chambers with a window arranged therebetween. UV radiation is introduced into one of the chambers at a side opposite the window so that it passes through that chamber, through the window and into the other chamber. The fluid medium to be purified is passed through the chambers and subjected to the radiation while in the chambers. The flow of the medium is through the chambers in series in some embodiments and in parallel in others. An embodiment is disclosed wherein a recirculation line is established around the reactor with the recirculation being continuous or intermittent. When intermittent the purified fluid medium also is drawn off intermittently, between the periods of recirculation. In some embodiments, the amount of radiation traversing all the chambers is monitored. If the monitored amount drops below a given amount, the apparatus is shut down. Alternatively, the rate of flow of the medium is adjusted, based on that monitored amount, with the rate of flow increasing or decreasing, respectively, in response to increases or decreases in that amount.

U.S. Pat. No. 4,476,105—dated Oct. 9, 1984, relates to a process for producing gaseous hydrogen and oxygen from water. The process is conducted in a photolytic reactor which contains a water-suspension of a photoactive material containing a hydrogen-liberating catalyst. The reactor also includes a column for receiving gaseous hydrogen and oxygen evolved from the liquid phase. To avoid oxygen-inactivation of the catalyst, the reactor is evacuated continuously by an external pump which circulates the evolved gases through means for selectively recovering hydrogen therefrom. The pump also cools the reactor by evaporating water from the liquid phase. Preferably, product recovery is effected by selectively diffusing the hydrogen through a heated semipermeable membrane, while maintaining across the membrane a magnetic field gradient which biases the oxygen away from the heated membrane. This promotes separation, minimizes the back-reaction of hydrogen and oxygen, and protects the membrane.

U.S. Pat. No. 5,126,111—dated Jun. 30, 1992, discloses a method of removing, reducing or detoxifying organic pollutants from a fluid, water or air, by contacting the fluid with a photoreactive metal semiconductor material in the presence of ultraviolet light of a wavelength to activate the photoreactive material. This is improved by simultaneously contacting the photoreactive material with a substance that accepts electrons and thus inhibits hole-electron recombination. Such substance will be such as to readily accept electrons either from the conduction band or from superoxide ions, and to rapidly dissociate into harmless products.

Still other photoreactors are described in U.S. Pat. Nos. 3,567,921; 3,769,517; 3,924,246; 4,296,066; 4,381,978; 4,454,835; 4,488,935; 4,544,470; 4,774,026; 4,863,608; 4,868,127; 4,957,773; 5,045,288; 5,094,815; and 5,149,377.

U.S. Pat. No. 5,439,652 (Sczechowski, et al.) issued on Aug. 8, 1995 states that a Beer's law type expression was found for the transmitted light as a function of the $TiO_2$ loading. From this relationship, the calculated light penetration depth for the 0.4% (by weight) Degussa $TiO_2$ slurry used in these experiments was approximately 1 mm.

U.S. Pat. No. 5,994,705 (Cooke, et al) issued on Nov. 30, 1999 is a continuation of U.S. application Ser. No. 08/946, 647, filed on Oct. 7, 1997 now U.S. Pat. No. 5,866,910 which is a continuation of U.S. application Ser. No. 08/438,234, filed on May 9, 1995, now U.S. Pat. No. 5,696,380 discloses a flow-through photochemical reactor includes a reactor body, which circumscribes a longitudinally extending channel having a generally annular cross section. This channel accommodates fluids passing between an inner wall of the reactor body and an outer wall of a photon-transmitting tube that is housed internally thereof. In addition, the reactor includes mechanically static, fluid-dynamic elements for passively inducing substantial turbulent flow within a fluid as it passes through the channel. This arrangement substantially increases the uniformity of the fluid's exposure to photons radiating from a source within the tube into the fluid and it is conducted through the channel.

Calgon Corporation's U.S. Pat. No. 6,565,803 issued to Bolton, et al. on May 20, 2003 and titled, "Method for the inactivation of cryptosporidium parvum using ultraviolet light," has a major drawback. The system utilizes mercury vapor bulbs housed in a quartz tube. Mercury is a pollutant that is transferred via the food chain. Any UV system incorporating a "bulb" is prone to burn out. Further, the glass or quartz envelope and the bulb become solarized due to the UV light. Consequently, dosages as specified within the '803 patent may not be sufficient to inactivate cryptosporidium.

Many other types of wave energy apparatuses are known in the prior art, but none of the known prior art utilizes the approaches encompassed within the scope of the present invention.

SUMMARY OF THE INVENTION

The present invention, which will be described in detail below, provides superior wave energy delivery to the fluid to be treated, a superior method for stripping and destroying volatiles *in sitsu* and a method for subjecting fluids, contaminants and pathogens to at least three forms of wave energy simultaneously. As a result, the pervasive prior art problem of absorbance or path length of wave energy through the fluid is overcome by the present invention. A significant, and novel, focus of the present invention is in the treatment of fluids with wave energy generated by a carbon arc, but the novelty of the invention is not limited to the carbon arc treatment approach. In addition, the present invention provides a means for treating matter with several forms of wave energy, including ultrasound. Without limiting the scope of the invention or the purposes for which the invention may be advantageously used, the present invention may be generally described as encompassing a method, apparatus, and means of constructing such apparatus, for treating a fluid subject to wave energy absorbance within a conduit, wherein several forms of wave energy are combined synergistically within the conduit to effectively treat the fluid.

It is an object of the present invention to provide a device for treating fluids which is capable of subjecting the fluid to several forms of wave energy.

An additional object of the present invention is to provide a device for treating fluids with wave energy at wavelengths, focus, intensity and residence times that is superior to prior methods.

Another object of the present invention is to provide a photochemical reactor apparatus that is superior to photochemical reactors known in the prior art.

Still another object of the present invention is to provide a wave energy reactor which installs easily into existing structures.

It is still further an object of the present invention is to provide a method, which overcomes residence time and absorbance phenomena associated with photochemical reactions.

The method(s), apparatus, and means of the invention will be described in detail with reference to the accompanying drawing figures.

DESCRIPTION OF THE PREFERRED EMBODIMENTS

Figure 1:
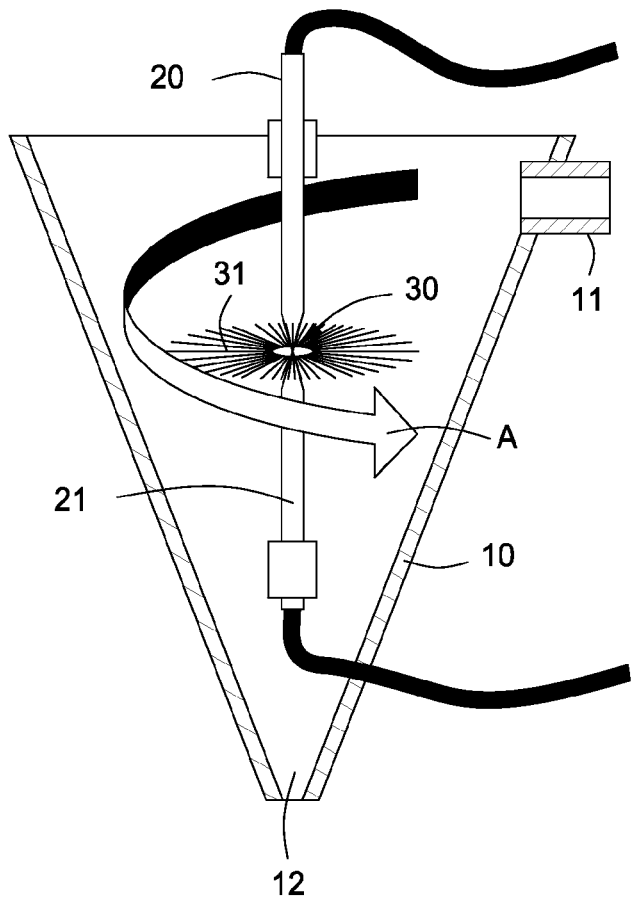
FIG. 1—Treatment of Fluids with Carbon Arc
FIG. 2—Carbon Arc in Cyclone Separator
FIG. 3—Carbon Arc in Gas-Sparged HydroCyclone
FIG. 4—Carbon Arc in Gas-Sparged Pipe with Tangential Flow
Figure 4:
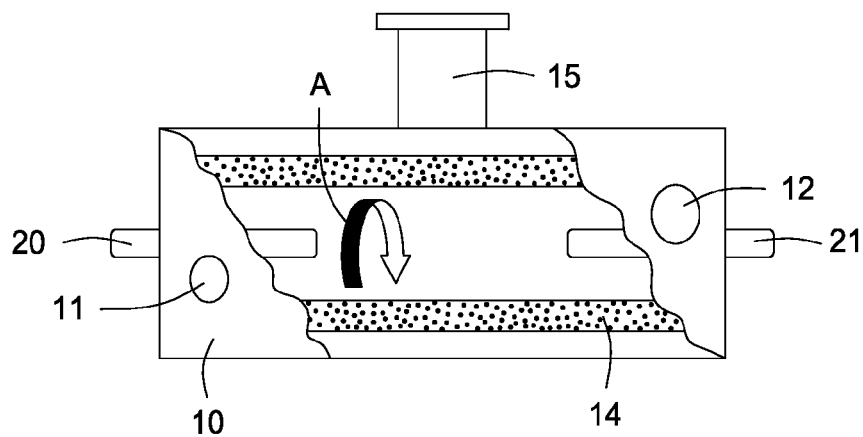

Prior art wave energy, in particular EMR, devices and methods, are designed for a given flow rate range. Simply put, the photochemical reactor has a known volume, and based upon the volume of the reactor the number of EMR sources which are needed to effect a reaction over a specified time period is calculated and commonly referred to as residence time (RT). Normally the EMR sources are continuous wave sources such as long linear low-pressure mercury arc lamps, medium pressure mercury lamps and short-arc HgXe lamps. Since these lamps are rated in watts, then the joules/second emitted from the lamps can be multiplied by the RT to specify an effective dose (watts/second/volume) to the treated fluid.

For example, the amount of radiation necessary to deactivate bacteria is known. Thus, simply by working backwards from this known value, in combination with the average population density of the bacteria, the variable or number of EMR sources and size of the reactor may be easily calculated. However, problems arise when bacteria counts increase from the assumed average value. Either a second reactor must be installed or more lights must be added to the existing reactor.

Another example, which will further clarify the current problems with prior art approaches, is the photochemical reaction between chlorine and hydrogen. The amount of energy necessary to cleave diatomic chlorine into its constituent radicals is about 243 KJ/mole. Thus, the amount of energy necessary to remove hydrogen within a chlorine stream within a chlor-alkali plant can be calculated.

Finally, a third example, which will help clarify the current problems with prior art, is the photochemical reaction for removal of contaminants from flue gas. One such contaminant, sulfur dioxide, when exposed to UV radiation in the presence of oxygen, will form sulfur trioxide. The sulfur trioxide can be reacted with fly ash for removal by an electrostatic precipitator.

In all three situations, the ideal system would allow for a conversion efficiency of greater than 99.9%. However, based upon current prior art designs and methods, scaling up from a bench scale test to an actual plant application is not practical or affordable, nor is the 99.9% conversion realistically attainable.

The Beer-Lambert Law can be applied to clearly show that a lamp placed inside a conduit would be an ineffective photochemical reactor. The Beer-Lambert Law and associated equation is significant to photochemical or wave energy reactor design. Although the following equation is straightforward, it is often misunderstood and incorrectly used.

$$A = \epsilon b c$$

Where A is absorbance (no units);
$\epsilon$ is the molar absorbtivity with units of L/mole/cm;
b is the path length of the sample (or photochemical reactor length); and
c is the concentration of the compounds in the solution with units of moles/liter.

Within this law, absorbance is directly proportional to the other parameters. The law indicates that the fraction of the radiation absorbed by each layer of the fluid is the same. The equation, "$A = \epsilon b c$" tells a photochemical reactor designer that absorbance depends on the total quantity of the absorbing compound in the radiation path through the photochemical reactor. Thus, if a designer refers to percent transmission (% T) an exponential curve can be generated comparing % T to pathlength. However, if absorbance is plotted against concentration, a straight line emerges. Thus, the linear relationship between concentration and absorbance is both simple and straightforward.

However, as omni-directional wave energy travels away from its source in a given vessel, in accordance with "$A = \epsilon b c$", the number of photons near the wall of the vessel has decreased, but the concentration of contaminants within the fluid is equal at any distance from the omni-directional lamp. Thus, if this reactor is designed for bacterial disinfection, the bacteria near the wave energy source receive a greater amount of energy then the bacteria near the wall of the vessel. As a result, bacteria kill is higher near the wave energy source and decreases by the square of the distance from the lamp.

Since this is an omni-directional lamp it follows the inverse square law, which states that the intensity of light observed from a source of constant intrinsic luminosity falls off in direct proportion to the square of the distance from the object. As an example, if 16 W/cm$^2$ is measured at a distance of 1 meter from a source, 4 W/cm$^2$ will be measured at 2 meters. The intensity can be similarly calculated at any other distance. The inverse square law is applicable to variations in intensity without regard to direction from the light source only in cases where the light source approximates a point source. However, the same principle is useful in understanding the decrease in intensity that occurs outward from a linear source, such as an elongate bulb, in a direction normal to the axis of the elongate source.

In the context of treating fluids with wave energy, another significant factor that has a significant effect on treatment efficacy is the distance that a given wave energy particle, such as a UV light photon will travel through a material. For example, UV light with a wavelength of 253.7 nm can penetrate water to a depth of over 24 inches, but a very think aluminum foil will block UV light completely. Accordingly, all UV light treatment systems are subject to the disadvantages and obstacles related to absorbance, or penetration distance through the fluid being treated. Penetration distance is also referred to as path length. Because of these factors, it can be understood that increasing the reactor volume to increase fluid residence time does not affect or change path length, and does not necessarily improve treatment effectiveness.

With these factors in mind the present invention can be more readily understood and its novelty and significance more readily appreciated. The present invention overcomes the problems of diminishing intensity and of path length by exposing a thin layer of fluid to wave energy in close proximity to the energy source. Referring now to FIG. 1, a vessel 10 capable of producing vortex flow as shown by arrow A, such as a funnel or cyclone, is utilized to produce a thin film of liquid flowing on the vessel wall around a gas core. When a liquid such as water is introduced into the funnel via inlet 11 in a vortex fashion A, a central core forms which is devoid of water. Carbon arc rods 20 and 21 are located within the central core. When in operation the carbon arc 30, which extends between the proximate tips of the carbon rods, produces deep UV light 31 for treating the water. The water is discharged from the funnel via an exit 12.

A vessel well suited for creating a vortex for use in the present invention for disinfecting and sterilizing utilizing induced cavitation is disclosed in U.S. Pat. No. 6,019,947, issued to Kucherov on Feb. 1, 2000, and titled, "Method and Apparatus for Sterilization of a Continuous Liquid Flow." The disclosure of the Kucherov patent is incorporated into the present description in its entirety. The improvement of the present invention over the teaching of the Kucherov '947 patent includes, without limitation, the factor that the carbon arc of the present invention adds two additional forms of wave energy for sterilization—UV light and free radicals or electrons.

Figure 2:
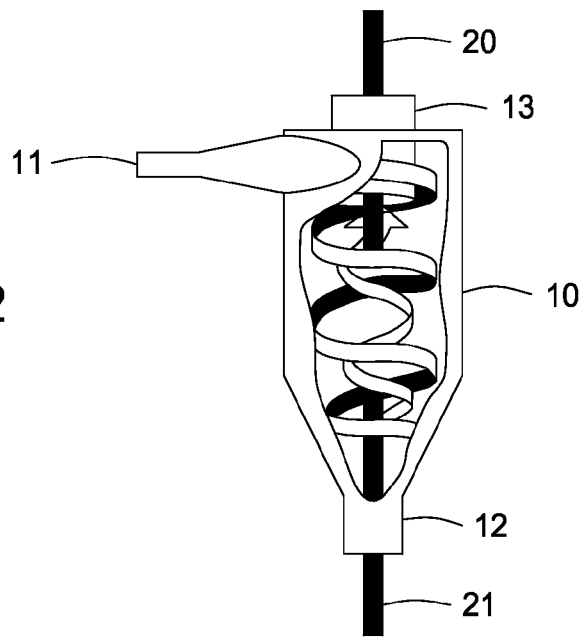

As illustrated in FIG. 2, a cyclone separator 10 can easily be modified for the present invention. The carbon rods 20 and 21 are inserted in the underflow and overflow of the cyclone separator 10. The carbon arc 30 is formed between the rods within the core of the cyclone separator.

Figure 3:
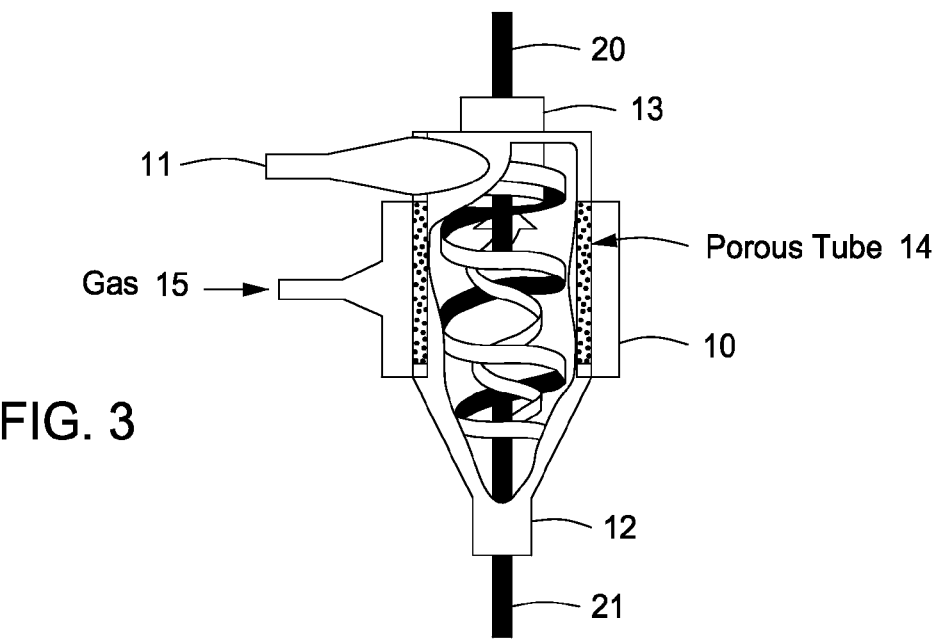

FIG. 3 illustrates an arrangement in which a hydrocyclone with a porous wall, referred to as an air-sparged hydrocyclone, can be used as the vessel 10 for practicing the present invention. The motivations for using an air/gas sparged hydrocyclone are to aid in stripping volatiles from the fluid and induce cavitation, in addition to the creation of a thin fluid film. It is known that air-sparged hydrocyclones can strip hydroscopic molecules, such as alcohols, from water. Further, the air boundary layer between the sparging surface and the fluid reduces friction, thus allowing the fluid to achieve and maintain higher velocities at lower pump pressures. This has a highly desirable effect if the fluid achieves a velocity sufficient to cavitate. Cavitation is the formation of bubbles in a liquid, followed by a subsequent collapse of the bubble. Cavitation can be viewed as a form of wave energy, because the cavitation creates sonic waves and sonic energy is a form of wave energy.

It is well known and well understood that cavitation can "kill" pathogens, produce chemical reactions and mix the fluid thoroughly. In addition, the thoroughly mixed fluid travels through a gas-sparged hydrocyclone in a corkscrew or vortex path, but as a very thin layer. This thin layer results in a very short penetration distance that must be achieved by the wave energy to achieve effective treatment through the full thickness of liquid. Consequently, the available path length for the wave energy in the treated fluid ceases to be a limitation on treatment effectiveness, and maximum absorption of wave energy will be achieved. It should be understood that wave energy path length and penetration distance are not related to or necessarily affected by the length of the vessel.

When the velocity of the liquid in a thin film air-sparged hydrocyclone is sufficiently to produce cavitation in the liquid, the high level of wave energy from cavitation, in combination with the wave energy generated by the unconfined carbon arc in accordance with the present invention, can dramatically enhance the performance of wave energy based liquid treatment. The addition of the carbon arc system described above to any gas sparger system will also provide dramatic treatment improvements from the expanded range of wave energies generated by the unconfined carbon arc.

Graphite rods are manufactured in sizes ranging from welding rod diameters of 0.125 inches to diameters of 6 feet for carbon rods commonly used in electric arc furnaces. Since World War II vintage carbon arc searchlights are widely available, the apparatus of the present invention can easily be constructed from that supply of surplus searchlights. Any DC power source can be used to create a carbon arc from graphite rods. A simple solar powered battery can be used as the DC source for the carbon arc, which enables the utilization of inexpensive disinfection systems for treating, e.g., drinking water, in remote areas as well as third world countries. The present invention also provides a means for a compact, but extremely powerful, wave energy system for disinfecting high flow rate streams such as ship ballast water and large municipal drinking water and wastewater plant effluent. In contrast to typical UV light systems, the present invention is not limited in size due to lamp construction, nor in performance due to solarization of a quartz lamp envelope. In addition, maximum transfer of wave energy occurs in the present invention, since the present invention uses an open arc. Furthermore, the present invention makes use of all the forms of wave energy produced from the carbon arc and not simply just the UV light irradiated from the plasma or tip of the hot carbon rod.

The utilization of a gas-sparged hydrocyclone as the vessel within the scope of the present invention is not simply for the cavitation and stripping effects. The Revex™ MTU, for example, produces a very thin fluid film. In combination with the thin fluid layer, the fluid flows in a spiral path around and along the longitudinal axis of the porous tube component of that apparatus. This produces a dramatic increase in liquid residence time within the reactor in comparison to linear flow through a reactor of the same length, and allows the use of a compact reactor with a much higher effective treatment capacity than is possible with reactors of the prior art.

The following non-limiting examples of treatment applications in which the present invention may be used are provided to demonstrate the range of utility of the invention as well as the novelty of the inventive concept. These examples also illustrate the extremely urgent need for such an invention in the context of health and environmental safety issues.

Mycobacteria in Metal Working Fluids

Environmental opportunistic mycobacteria, have been implicated in outbreaks of a variety of respiratory problems in a wide variety of settings. One common feature of the outbreaks has been exposure to aerosols. Aerosols are generated from metalworking fluids during machining and grinding operations as well as from other sources such as indoor swimming pools, hot tubs, and water-damaged buildings. In the industrial setting, an estimated 1.2 million workers in the United States are exposed to aerosols generated by metal grinding, and the financial and social impacts of respiratory problems experienced by these workers are substantial. Mycobacteria are readily aerosolized and are resistant to disinfection. In the vast majority of outbreaks of respiratory problems attributed to aerosolized mycobacteria, the water sources of the aerosols had been disinfected. In fact, it is believed that conventional disinfection may select for the predominance and growth of mycobacteria.

The present invention provides the ability to subject fluids such as metalworking fluids to a plurality of wave energy sources, and accordingly shows great promise for effective elimination and control of mycobacteria and other biological contaminants in those fluids. Though mycobacteria can survive chemical disinfection, it is believed that the bacterial will not survive exposure to the combination of UV radiation and free electrons from the carbon arc of the present invention, especially with the further combination of sonic wave energy from cavitation effects. Elimination or reduction of respiratory problems in the work place associated with metal working fluids will have significant financial benefits in affected industries, as well as significant social benefits from the reduction of those health problems.

Poultry Chiller Water Statistically, each person in the United States consumes 44 kg (96 lb) of poultry meat annually. Poultry accounts for about 36% of meat consumption, second only to beef in the American diet. The wholesomeness of poultry products has a profound impact on public safety and health. The U.S. poultry industry produced 20 billion pounds of chicken and 6 billion pounds of turkey each year. Almost all poultry products are produced in "ready-to-cook" forms from automated plants of multimillion bird capacity. In these plants birds are slaughtered, defeathered, eviscerated, rinsed, chilled, and packed. Chilling carcasses rapidly to below 40 F is crucial for minimizing microbial growth and preserving carcass quality. It is accomplished by immersing rinsed carcasses in icy water in one, two, or three long tanks, the chillers. Many processors use chlorine to control microbial populations in poultry chiller water (PCW). Presently, chlorine and its hydration products, hypochlorous acid and hypochlorite, are the only disinfectants permitted by the regulatory agencies for use in PCW (U.S. Department of Agriculture, 1993).

Poultry chiller water is known for its high content of organic matter. Chlorination of PCW results in the formation of trihalomethanes, primarily chloroform, and other mutagenic compounds that have yet to be identified. Although the health impact of these potentially deleterious compounds has not been established, providing alternative methods for disinfecting PCW is highly desirable. Further, the recycling of chiller water may offer a way to prevent environmental pollution while helping to conserve valuable water resources.

It is believed that treatment of PCW with the high intensity UV radiation and free electrons generated by the carbon arc of the present invention, especially when the PCW is controlled to be exposed to those wave energies in a thin film in close proximity to the energy source will overcome the prior art disadvantages of intensity and path length and result in safe and effective disinfection of the PCW. The treatment effectiveness can be enhanced within the scope of the present invention by further combining the sonic wave energy associated with cavitation with the carbon arc wave energies by conducting the treatment in, e.g., the Revex™ MTU apparatus.

Marine Ballast Water

Invasive aquatic species are one of the four greatest threats to the world's oceans, and can cause extremely severe environmental, economic and public health impacts. The introduction of invasive marine species into new environments by ships' ballast water has been identified as one of the four greatest threats to the world's oceans. Shipping moves over 80% of the world's commodities and transfers approximately 3 to 5 billion tons of ballast water internationally each year. A similar volume may also be transferred domestically within countries and regions each year. Ballast water is absolutely essential to the safe and efficient operation of modem shipping, providing balance and stability to un-laden ships. However, it may also pose a serious ecological, economic and health threat.

Reballasting at sea, as recommended by the IMO guidelines, currently provides the best-available measure to reduce the risk of transfer of harmful aquatic organisms, but is subject to serious ship-safety limits. Even when it can be fully implemented, this technique is less than 100% effective in removing organisms from ballast water. Some parties even suggest that reballasting at sea may itself contribute to the wider dispersal of harmful species, and that island states located 'down-stream' of mid-ocean reballasting areas may be at particular risk from this practice. It is therefore extremely important that alternative, effective ballast water management and/or treatment methods are developed as soon as possible, to replace reballasting at sea.

MTBE in Drinking Water

MTBE, a gasoline additive, has contaminated many aquifers. Due to its high solubility it is extremely difficult to remove from water. However, when a carbon arc is incorporated in the central core of, preferably, the Revex™ MTU, it is believed that the combination of cavitation energy with UV light energy and free electrons from the carbon arc will have a synergistic effect for the removal and/or decomposition of MTBE without the necessity of removing it from the water. Without being bound by theory, it is believed that oxidants such as free radicals, hydrogen peroxide and ozone will form from cavitation and from the contact of air with the carbon arc plasma. As a result, the MTBE will be oxidized to carbon dioxide and water.

Pathogens such as Anthrax and Legionella in Drinking Water and/or Air

The synergistic affect of cavitation, UV light, and insitu generated oxidants produced by the apparatus of the present invention will have a deleterious affect on pathogens such as anthrax and legionella. The present invention can be used in a dual approach by scrubbing air to remove pathogens and then recirculating the liquid for a pathogen kill.

Paint Booth VOCs

Typically, a downdraft waterfall scrubber is used to scrub VOCs from air exiting from a paint point. As a result, the water is contaminated with VOCs. Without being bound by theory it is believed that the use of, preferably, the Revex™ MTU in the present invention will achieve a transfer of the VOCs from the water into the carbon arc core. The VOCs within the core will be thermally oxidized. This illustrates that the present invention can be utilized as a thermal oxidizer.

Spent Caustic

Spent caustic solutions generated from refineries and petrochemical facilities are usually considered a hazardous waste due to the presence of benzene. It is believed that the present invention, utilizing, preferably, Revex™ MTU apparatus, can clean the spent caustic by stripping the benzene from the caustic solution and subsequently decomposing the benzene within the apparatus with the carbon arc plasma.

COD—Chemical Oxygen Demand

Not being bound by theory it is believed that the carbon arc/gas-sparged hydrocyclone system can reduce COD in industrial wastewater. To the extent that the COD is not completely oxidized to carbon dioxide and water, it is believed that the present invention will convert COD into organic matter that can be decomposed in a biological wastewater treatment facility.

The foregoing description of the apparatus and methods of the invention in preferred and alternative embodiments and variations, and the foregoing examples of processes for which the invention may be beneficially used, are intended to be illustrative and not for purposes of limitation. The invention is susceptible to still further variations and alternative embodiments within the full scope of the invention, recited in the following claims.

The invention claimed is:

1. A method of treating liquids using wave energy, comprising the steps of:
   creating a generally longitudinally extending source of wave energy comprising an open electrical arc between two spaced apart and axially aligned electrodes;
   creating a flow of liquid in a thin film along a vortex path in close proximity to and surrounding said source of wave energy using a hydrocyclone; and
   directly exposing said liquid to said wave energy as said liquid flows along said path such that only a gas separates said liquid from said open electrical arc.

2. The method of claim 1, wherein said electrodes comprise carbon.

3. The method of claim 1, wherein said wave energy comprises ultraviolet light, infrared light, visible light, sonic waves, supersonic waves, ultrasonic waves, electrons or cavitations.

4. The method of claim 1, wherein said wave energy comprises ultraviolet light, infrared light and electrons.

5. The method of claim 1, wherein said liquid comprises a wastewater.

6. The method of claim 1, wherein said step of creating said longitudinally extending source of wave energy comprises the steps of:
   providing a DC power source connected to said electrodes; and
   creating said electrical arc between said electrodes.

7. The method of claim 1, wherein said hydrocyclone comprises an air-sparged hydrocyclone.

8. A method of treating liquids using wave energy, comprising the steps of:
   creating a generally longitudinally extending source of wave energy by creating an open electrical arc between two spaced apart and axially aligned electrodes connected to a DC power supply, wherein said wave energy comprises ultraviolet light, infrared light and electrons;
   creating a flow of liquid in a thin film along a vortex path in close proximity to and surrounding said source of wave energy using a hydrocyclone;
   directly exposing said liquid to said wave energy as said liquid flows along said path such that only a gas separates said liquid from said open electrical arc; and
   wherein said liquid comprises a wastewater.

* * * * *

UNITED STATES PATENT AND TRADEMARK OFFICE
CERTIFICATE OF CORRECTION

PATENT NO. : 7,422,695 B2
APPLICATION NO. : 10/935786
DATED : September 9, 2008
INVENTOR(S) : Todd Foret It is certified that error appears in the above-identified patent and that said Letters Patent is hereby corrected as shown below:

Col. 7, line 51
Replace "sufficiently" with --sufficient--

Col. 8, line 64
Replace "work place" with --workplace--

Signed and Sealed this

First Day of September, 2009

David J. Kappos
*Director of the United States Patent and Trademark Office*